(12) United States Patent
Engel

(10) Patent No.: US 6,610,130 B2
(45) Date of Patent: Aug. 26, 2003

(54) AQUEOUS INK SET AND ITS USE

(75) Inventor: Stefan Engel, Rückersdorf (DE)

(73) Assignee: J. S. Staedtler GmbH & Co., Nürnberg (DE)

( * ) Notice: Subject to any disclaimer, the term of this patent is extended or adjusted under 35 U.S.C. 154(b) by 0 days.

(21) Appl. No.: 09/938,849

(22) Filed: Aug. 24, 2001

(65) Prior Publication Data

US 2002/0073892 A1 Jun. 20, 2002

(30) Foreign Application Priority Data

Aug. 26, 2000 (DE) .................................... 100 41 982

(51) Int. Cl.⁷ ............................................. C09D 11/02
(52) U.S. Cl. ................................ 106/31.27; 106/31.43; 106/31.58
(58) Field of Search ..................... 106/31.27, 31.43, 106/31.58

(56) References Cited

U.S. PATENT DOCUMENTS

| | | | |
|---|---|---|---|
| 5,772,742 A | 6/1998 | Wang | 106/31.27 |
| 5,888,284 A * | 3/1999 | Engel | 106/31.27 |
| 6,261,350 B1 * | 7/2001 | Kabalnov | 106/31.33 |
| 6,383,277 B1 * | 5/2002 | Loosli | 106/31.6 |
| 6,468,337 B1 * | 10/2002 | Gundlach et al. | 106/31.28 |

FOREIGN PATENT DOCUMENTS

| | | |
|---|---|---|
| DE | 692 05 760 T2 | 6/1996 |
| DE | 196 28 209 A1 | 2/1998 |
| DE | 197 34 241 A1 | 2/1999 |

* cited by examiner

Primary Examiner—Helene Klemanski
(74) Attorney, Agent, or Firm—Friedrich Kueffner

(57) ABSTRACT

An ink set consists of several inks containing at least one of a red ink and a magenta ink, one of a blue ink and a cyan ink, and a yellow ink for piezo inkjet printers operating according to a drop-on-demand method. Each one of the inks contains at least one water-soluble dye as a principal colorant, a solvent, and one or more anti-drying agents. The solvent is substantially water. A first one of the inks contains "Direct Blue 199" as a primary or exclusive dye, a second one of the inks contains "Reactive Red 180" as a primary or exclusive dye, and a third one of the inks contains "Reactive Yellow 37" as a primary or exclusive dye. A black ink may be added to the ink set.

17 Claims, 2 Drawing Sheets

COLOR SPACE OF INK SET ACCORDING TO INVENTION

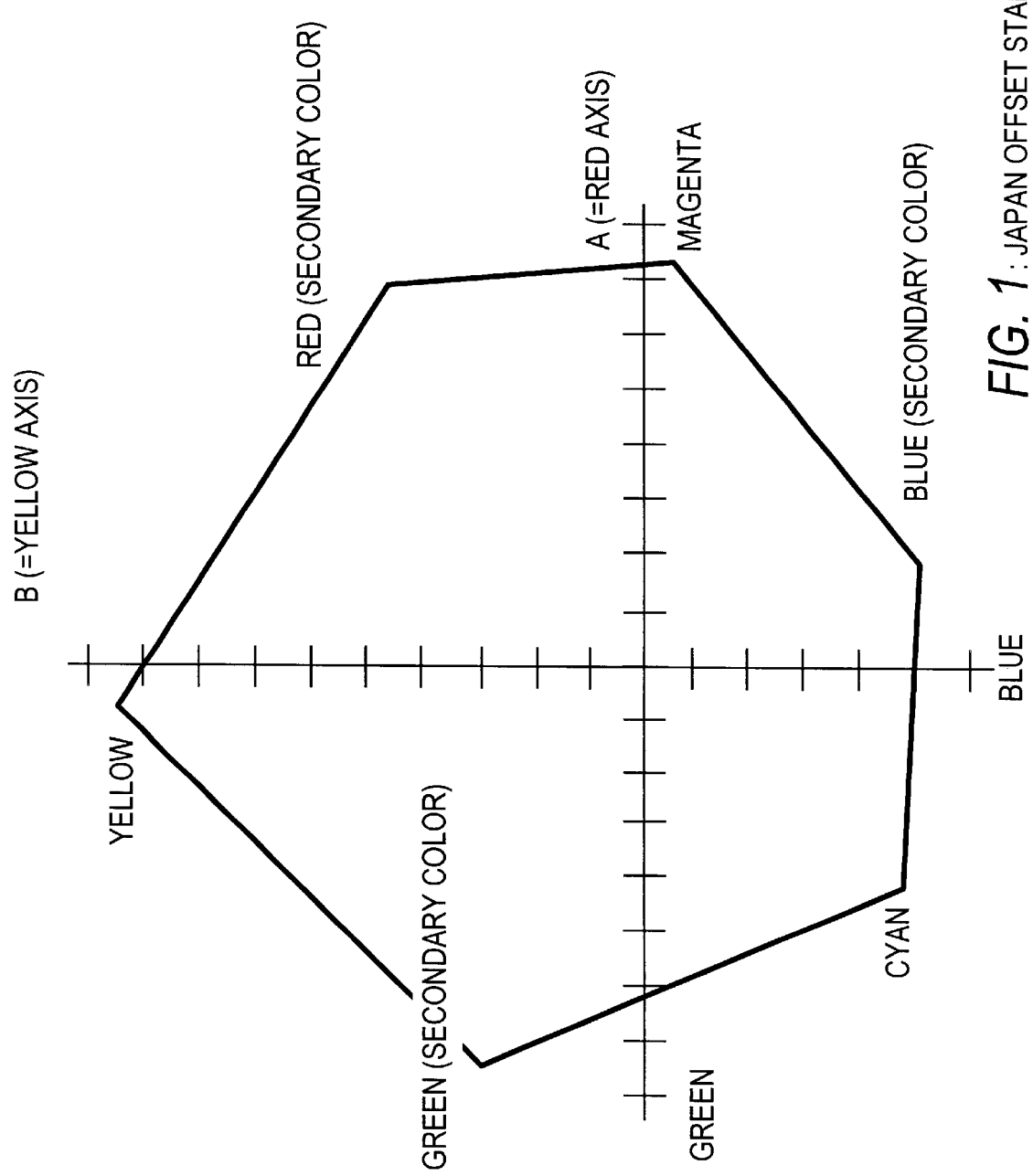

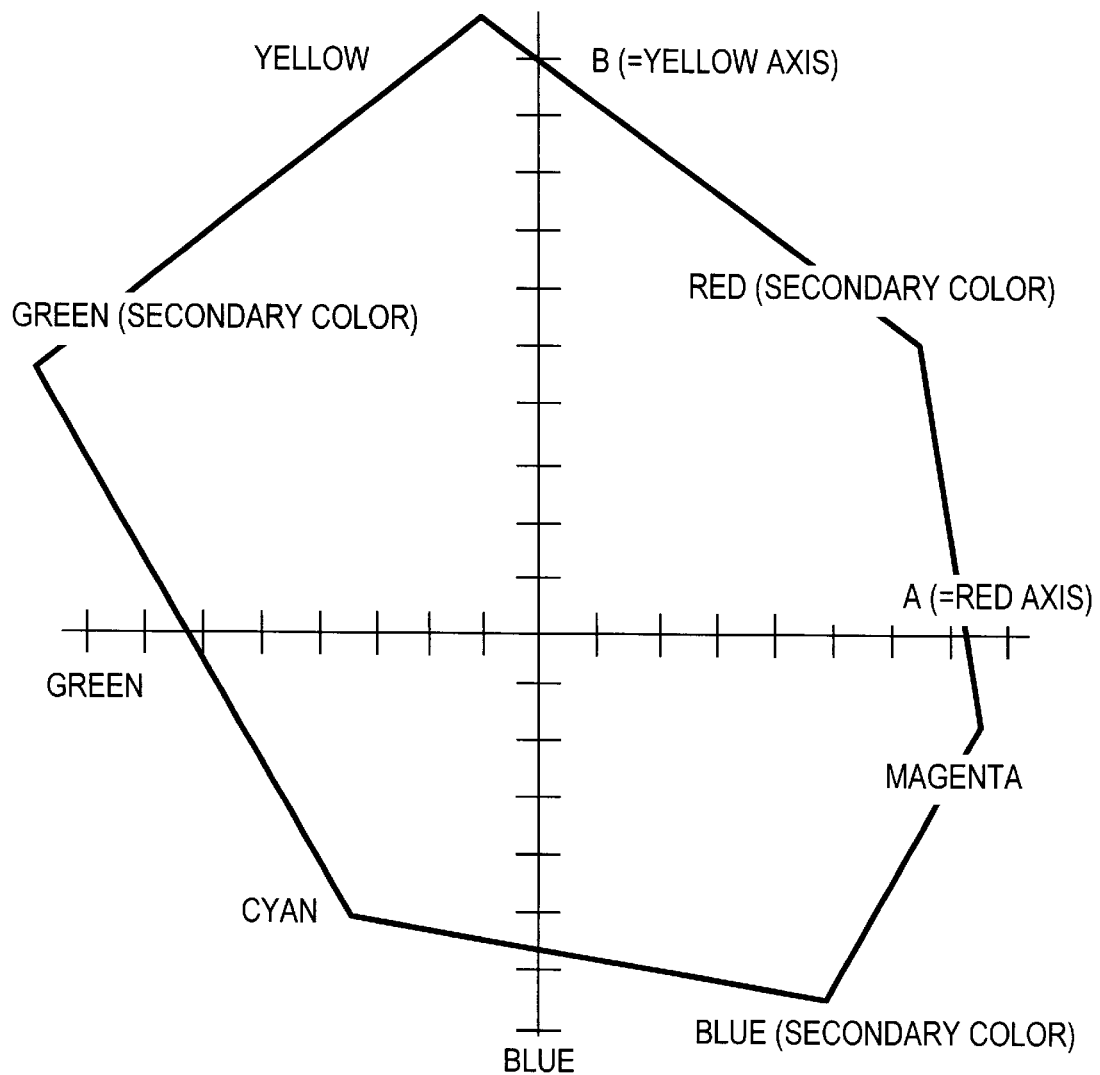
FIG. 2 : COLOR SPACE OF INK SET ACCORDING TO INVENTION

AQUEOUS INK SET AND ITS USE

BACKGROUND OF THE INVENTION

1. Field of the Invention

The invention relates to aqueous ink sets and their use as proof ink sets in the preliminary printing stage for offset or rotogravure printing for which purpose inkjet systems, in particular, also piezo drop-on-demand systems are used.

2. Description of the Related Art

The proof inks are used to produce so-called "proofs", a preliminary printing stage which is binding with regard to color and is used prior to the offset or rotogravure printing process in order to represent preliminarily a future offset or rotogravure print as true to color as possible and corresponding to a color space which is defined by the employed colors. A possible basis for the offset color space is the so-called Japan Offset Standard or other comparable regional standards such as for example the Euroscale.

An important criterion for evaluating such "proofs" is thus the color space which is defined by the color locations of the primary and secondary colors of the inks of an ink set. For producing a valid preliminary printing stage or "proof", certain conditions must be fulfilled, such as high resolution in the "proof", i.e., at least 600 dpi for drop-on-demand methods, soft color courses, i.e., use of so-called light colors such as magenta and cyan, a color space as large as possible, wherein the color locations of the primary and secondary colors are as close as possible to the offset primary and secondary mixing space of the respective standard, as well as a high color stability of a print on special proof papers for universal use.

Aqueous ink sets or inks for drop-on-demand printing processes are known in principle. For example, U.S. Pat. No. 5,772,742 discloses an ink set for smooth and coated papers as well as transparent foils which has a high light fastness and has a high safety against bleeding of the colors at its print edges.

The German patent application 196 28 209 A1 describes aqueous ink sets which have a high light fastness and uniform or identical fading rates with regard to the individual as well as mixed colors.

Moreover, according to German document DE 692 05 760 T2 an ink set for ink jet printers is known which can be used for simple as well as coated papers and transparent foils. In addition to the minimal tendency of bleeding of the colors, such an ink set is said to have, inter alia, a good resistance against incrustations, a good stability, and a high color saturation.

The German patent application 197 34 241 A1 describes an ink set for use in ink jet printers where the colors are combined such that the bleeding of two inks into one another is reduced or prevented.

A disadvantage of these known inks or ink sets is that the aforementioned conditions for a preliminary printing stage as color-true as possible can be fulfilled only with great limitations or cannot be fulfilled at all.

Moreover, it was found to be disadvantageous that a print of a preliminary printing stage with inks according to the prior art often already feels dry to the touch but is, in fact, not yet dry.

During the drying process over the course of weeks, visible color shifts occur which on a short-term basis result in a wrong evaluation of the preliminary printing stage. A long drying process of the inks of the prior art is the result of a high contents of anti-drying agents which are added so that the jets of the printing system will not dry up and become clogged.

SUMMARY OF THE INVENTION

It is an object of the present invention to provide aqueous ink sets with soluble dyes whose use in inkjet systems, in particular, those using the drop-on-demand methods, will not exhibit the aforementioned disadvantages and which cover as much as possible at least one standard, for example, the Japan Offset Standard, and which quickly dry on printing media without special coatings, for example, media for use in piezo printers, provide stable color locations, and, moreover, remain light-fast over weeks in an interior space.

In accordance with the present invention, this is achieved in that the solvent is substantially water, that the inks contain at least one water-soluble dye as the essential colorant, wherein the first ink contains "Direct Blue 199", the second ink contains "Reactive Red 180", and a third ink contains "Reactive Yellow 37", and an optionally present fourth ink contains "Acid Black 194", either exclusively or as the primary dye, respectively.

The ink set is used primarily as a medium for short-term color-stable prints of all kinds. They are primarily used in piezo inkjet printers which operate according to the drop-on-demand method. Their primary use is as a proof ink set for producing proofs (test prints) as preliminary printing stages for offset or rotogravure printing.

BRIEF DESCRIPTION OF THE DRAWINGS

The drawings show in:

FIG. 1 the Japan Offset Standard which is the basis for proof production;

FIG. 2 with Table 2 the positions of the individual inks with corresponding coordinates (a, b, L) of an ink set according to the invention.

DESCRIPTION OF THE PREFERRED EMBODIMENTS

In FIG. 1, the Japan Offset Standard is illustrated which is one standard for proof production. In Table 1 of FIG. 1 the coordinates on the axes a=red and b=yellow are listed which determine optimized color locations of the primary colors wherein several color locations, in turn, define or describe the color space. A color space has, in addition to the illustrated axes a (red/green axis) and b (yellow/blue axis) also an L axis (not illustrated) which represents a degree of lightness or luminescence. For a comparative evaluation of an ink set with the aid of the Japan Offset Standard the projection of the color locations (a; b; L) into the plane defined by the axes a and b is sufficient.

FIG. 2 and Table 2 show the positions of the individual inks with the corresponding coordinates (a, b, L) of an ink set according to the invention. This illustration in particular shows also that the very important "yellow shift" into the green area is achieved.

TABLE 1

Coordinates of the Japan Offset Standard

| | L = lightness | a (= red axis) | b (= yellow axis) |
|---|---|---|---|
| yellow | 87.6 | −6.7 | 9.27 |
| red | 46.1 | 69.0 | 46.6 |
| magenta | 46.6 | 73.9 | −6.0 |
| blue | 21.0 | 20.0 | −51.1 |

TABLE 1-continued

Coordinates of the Japan Offset Standard

|  | L = lightness | a (= red axis) | b (= yellow axis) |
|---|---|---|---|
| cyan | 54.6 | −39.5 | −48.4 |
| green | 49.8 | −73.7 | 28.1 |

TABLE 2

Coordinates of the Ink Set According to the Invention

|  | L = lightness | a (= red axis) | b (= yellow axis) |
|---|---|---|---|
| yellow | 89.5 | −11.3 | 108.4 |
| red | 42.1 | 65.9 | 51.1 |
| magenta | 43.2 | 76.7 | −16.4 |
| blue | 14.2 | 51.4 | −64.1 |
| cyan | 57.12 | −31.8 | −50.6 |
| green | 52.2 | −90.34 | 44.0 |

The color space of the ink set according to the invention is better positioned, i.e., more similar to the Japan Offset Standard, than the color space of the currently commercially available inks according to the prior art; in particular, it was found that yellow with a slight greenish cast or tint is very important for producing proofs.

When using the inks according to the invention, the so-called L-values, which values describe the lightness, i.e., the third axis, meet much better the Japan Offset Standard in the blue area than is the case for the inks of the prior art.

Moreover, the inks according to the invention dry quickly on all conventional inkjet media and therefore save the user the procurement of expensive specially coated printing media for piezo printing systems.

After at most one day of drying time no visible color shifts of the color locations will occur anymore, i.e., no color changes such as lightening will occur. The employed dyes in the inks according to the invention are Reactive Yellow 37, Reactive Red 180, Direct Blue 199, and Acid Black 194.

In comparison to the prior art, the inks according to the invention are characterized by a reduced contents of anti-drying agents.

It was found that the color space of the Japan Offset Standard can be covered substantially completely when using the aforementioned dyes.

The invention will now be explained with the aid of ink examples.

EXAMPLE 1

Boundary Example 35 to 95% by weight water (W) as the solvent (LM)
3 to 30% by weight anti-drying agent (TV)
0.1 to 30% by weight colorant (FM)
0 to 1% by weight preservative (KM)
0 to 5% by weight pH adjusting agent and optionally
0 to 5% by weight other ink additives.

EXAMPLE 2

Cyan (T1)

13% by weight anti-drying agent (TV)
7% by weight Direct Blue 199 as the dye (FS1)
1% by weight triethanol amine (TEA)
0.1% by weight preservative (KM)
remainder=water (W).

EXAMPLE 3

Magenta (T2)

23% by weight anti-drying agent (TV)
2.1% by weight Reactive Red 180 as the dye (FS1)
1.0% by weight triethanol amine (TEA)
0.1% by weight preservative (KM)
remainder=water (W).

EXAMPLE 4

Yellow Ink (T3)

22% by weight anti-drying agent (TV)
4% by weight Reactive Yellow 37 as the dye (FS2)
1.8% by weight triethanol amine (TEA)
0.1% by weight preservative (KM)
remainder=water (W).

EXAMPLE 5

Black Ink (T4)

21% by weight anti-drying agent (TV)
8% by weight Acid Black 194 as the dye (FS4)
0.1% by weight preservative (KM)
0.9% by weight triethanol amine (TEA)
remainder=water (W) as the solvent (LM).

EXAMPLE 6

"Light"/Cyan (T1)

20% by weight anti-drying agent (TV)
2.5% by weight Direct Blue 199 as the dye (FS1)
2% by weight triethanol amine (TEA)
0.1% by weight preservative (KM)
remainder=water (W).

EXAMPLE 7

"Light"/Magenta (T2)

23% by weight anti-drying agent (TV)
0.7% by weight Reactive Red 180 as the dye (FS2)
1% by weight triethanol amine (TEA)
0.1% by weight preservative (KM)
remainder=water (W)

EXAMPLE 8

Ink Set (TS1)

An ink set (TS1), comprised of cyan, magenta, and yellow inks, contains a mix of the inks of examples 2, 3, 4.

EXAMPLE 9

Ink Set (TS2)

An ink set (TS2), comprised of cyan, magenta, yellow and black inks, contains the inks of the examples 2, 3, 4, and 5.

Each of the inks of examples 1 to 7 contains as an anti-drying agent glycerin and/or a glycol derivative such as diethylene glycol and/or multi-valent alcohols, such as 1,6-hexanediol and/or pentaerythrite or a mixture of all of them or some of them.

Optionally, the ink can contain further ink additives such as fatty acid polyglycol ether as a wetting agent, a triazine derivative as a preservative, and/or cyclic ethers or alcohols as a drying accelerator for shortening the drying time on paper.

The aqueous inks or ink sets are suitable for writing, drawing, painting, printing, in particular, also for inkjet or other printing and marking methods.

An ink set is comprised, in general, of several inks (T1, T2, T3, T . . . ), red or magenta, blue or cyan, and yellow and optionally black inks. They are used primarily in piezo inkjet printers which operate according to the drop-on-demand method. Each ink contains a soluble dye (FS) as the primary colorant, a solvent (LM) as well as ink additives such as one or more anti-drying agents (TV) and optionally preservatives (KM) and/or other additives (Z1, Z2, Z3, Z4, Z . . . ). The solvent (LM) is essentially water (W). Each ink (T1, T2, T3, T . . . ) contains at least one water-soluble dye (FS1, FS2, FS3, FS4) as the primary colorant (FM), respectively. A first ink (T1) contains "Direct Blue 199" (FS1), a second ink (T2) contains "Reactive Red 180" (FS2), and a third ink (T3) contains "Reactive Yellow 37" (FS3), and the optionally present fourth ink (T4) contains "Acid Black 194" (FS4). The dyes in the individual inks are used as the exclusive or as the primary dye. Each ink (T1, T2, T3, T . . . ) contains also anti-drying agents such as glycerin (G), diethylene glycol, 1,6-hexanediol, pentaerythrite or a mixture thereof. Further ink additives (ZS) in the inks are fatty acid polyglycol ether as a wetting agent, a triazine derivative as a preservative, and/or cyclic ethers or alcohols as a drying accelerator for shortening the drying time on paper. The employed colorants (FM) are substantially salt-free.

Moreover, the colorants (FM), before being processed, are present in the form of liquid dyes with a dye contents of 2–50% wherein the carrier substance is water and/or alcohol and/or another (non-alcohol) organic solvent. The inks (T1, T2, T3, T . . . ) can contain as further ink additives or other agents (ZS, Z3, Z4) triethanol amine (TEA), surface-active agents (T), preservatives (KM) and/or anti-corrosion agents (AKM).

The surface-active agents (T) can be fatty alcohol poly glycol ether. The preservative (KM) can be a solution of O-acetals and N-acetals, halogenated acid amide derivatives, and/or N-, S-heterocyclic compounds.

The inks (T1, T2, T3, T . . . ) according to the invention contain respectively 0.1 to 30% by weight dye (FS1, FS2, FS3, FS4), FS . . . ) as a colorant (FM), 35 to 95% by weight water (W) as a solvent (LM), 3 to 30% by weight anti-drying agents (TV), and 0 to 11% by weight other ink additives (ZS, Z2, Z3, Z4, Z . . . ).

Such ink sets (TS) are used as a medium for producing a short-term color stable print of all kinds. The ink set (TS) comprised of several inks (T1, T2, T3, T . . . ) is used in inkjet systems, in particular, drop-on-demand systems, as an ink set for proofs (test prints) as preliminary printing stages, in offset or rotogravure printing.

While specific embodiments of the invention have been shown and described in detail to illustrate the inventive principles, it will be understood that the invention may be embodied otherwise without departing from such principles.

What is claimed is:

1. An ink set comprised of several inks comprising at least one of a red ink and a magenta ink, one of a blue ink and a cyan ink, and a yellow ink for piezo inkjet printers operating according to a drop-on-demand method, wherein each one of the inks comprises at least one water-soluble dye as a principal colorant, a solvent substantially in the form of water, and one or more anti-drying agents, wherein a first one of the inks contains "Direct Blue 199" as a primary or exclusive dye, a second one of the inks contains "Reactive Red 180" as a primary or exclusive dye, and a third one of the inks contains "Reactive Yellow 37" as a primary or exclusive dye.

2. The ink set according to claim 1, wherein a fourth one of the inks contains "Acid Black 194" as a primary or exclusive dye.

3. The ink set according to claim 1, wherein the inks further comprise one or more ink additives, respectively.

4. The ink set according to claim 3, wherein a first one of the ink additives is fatty acid polyglycol ether as a wetting agent, wherein a second one of the ink additives is a cyclic ether as a drying accelerator on paper, wherein a third one of the ink additives is an alcohol as a drying accelerator on paper, and wherein a fourth one of the ink additives is a triazine derivative as a preservative.

5. The ink set according to claim 1, wherein the anti-drying agent is comprised of one or more compounds selected from the group consisting of glycerin, diethylene glycol, 1,6-hexanediol, and pentaerythrite.

6. The ink set according to claim 1, wherein the colorant is substantially salt-free.

7. The ink set according to claim 1, wherein the colorant, before being processed to the ink, is a solution having a dye contents of 2 to 50%, wherein the solution carrier is at least one solutizing agent selected from the group consisting of water, alcohol, and an organic non-alcoholic solvent.

8. The ink set according to claim 1, wherein the inks further contain triethanol amine.

9. The ink set according to claim 1, wherein the inks further contain one or more ink additives selected from the group consisting of surface active agents, preservatives, and anti-corrosion agents.

10. The ink set according to claim 1, wherein the inks further contain fatty alcohol polyglycol ether.

11. The ink set according to claim 1, wherein the inks further contain a solution of one or more of preservative compounds selected from the group consisting of O-acetals, N-acetals, halogenated acid amide derivatives, and N-,S-heterocyclic compounds.

12. The ink set according to claim 1, wherein the inks contain, respectively:

0.1 to 30% by weight dye as the colorant;

35 to 95% by weight water as the solvent; and 3 to 30% by weight anti-drying agent.

13. The ink set according to claim 12, wherein the inks further contain ink additives up to 11% by weight, respectively.

14. The ink set according to claim 13, wherein the first ink is comprised of:

7% by weight "Direct Blue 199" as a colorant;

13% by weight anti-drying agent;

1% by weight ink additive in the form of triethanol amine;

0.1% by weight ink additive in the form of a preservative and remainder water.

15. The ink set according to claim 13, wherein the second ink is comprised of:

2.1% by weight "Reactive Red 180";

23% by weight anti-drying agent;

0.1% by weight ink additive in the form of a preservative;

1% by weight ink additive in the form of triethanol amine; and remainder water.

16. The ink set according to claim 13, wherein the third ink is comprised of:

4% by weight "Reactive Yellow 37";

22% by weight anti-drying agent;

0.1% by weight ink additive in the form of a preservative;

1.8% by weight ink additive in the form of triethanol amine; and remainder water.

17. The ink set according to claim 1, wherein a fourth one of the inks contains "Acid Black 194" as a primary or exclusive dye and the fourth ink further comprise one or more ink additives, wherein the fourth ink is comprised of:

8% by weight "Acid Black 194";

21% by weight anti-drying agent;

0.1% by weight ink additive in the form of a preservative;

0.9% by weight ink additive in the form of triethanol amine; and water as a primary solvent.

* * * * *